May 3, 1960 — N. R. WYNN — 2,935,174
VIBRATORY FEED MECHANISM
Filed Nov. 10, 1958

INVENTOR
N. R. WYNN
BY R. P. Miller
ATTORNEY

United States Patent Office 2,935,174
Patented May 3, 1960

2,935,174
VIBRATORY FEED MECHANISM

Norman R. Wynn, Indianapolis, Ind., assignor to Western Electric Company, Incorporated, New York, N.Y., a corporation of New York Application November 10, 1958, Serial No. 772,871

3 Claims. (Cl. 198—30)

This invention relates to a vibratory feed mechanism and more particularly to a vibratory feed mechanism provided with an undulated flat spring that imparts diverse forces to articles and prevents jamming as articles are passed through a restricted outlet.

In feed mechanisms, frequent jamming occurs as articles are fed from a hopper or other similar reservoir through a constrained egress. In order to alleviate jamming, vibratory mechanisms have been developed; however, it has been found that vibrations alone will not suffice to eliminate the jamming problem. Further attempts have been made to prevent jamming by providing vibratory mechanisms with resilient means such as straight or slightly curved springs but even with these expedients, frequent jamming continues to occur.

It is a prime object of this invention to provide a new and improved non-jamming vibratory feed mechanism.

Another object of this invention is to provide a vibratory feed mechanism with an undulated member that imparts numerous diverse forces to articles being fed through a converging channel.

A further object of this invention is to provide a vibratory mechanism with a flat spring formed in a sinusoidal configuration wherein the magnitude and period of the sinusoids vary.

With these and other objects in view, the present invention contemplates the use of any standard vibratory device having a flange table mounted thereupon for receiving a supply of articles. Mounted upon the table is an undulated member which cooperates with a portion of the flange to provide a converging channel that terminates in a restricted outlet. Vibratory motion is imparted to the table and to the undulated member and articles are transferred through the channel to the outlet. Jamming of the articles is precluded since the undulations which contact the articles are small in size compared to the articles and impart numerous diverse, normal and tangential forces that maintain the articles in a constant state of flux.

Other objects and advantages of the present invention will be apparent from the following detailed description when considered in conjunction with the accompanying drawing wherein:

Fig. 4 is a fragmentary sectional view taken along the line 4—4 of Fig. 1.

Figure 1:
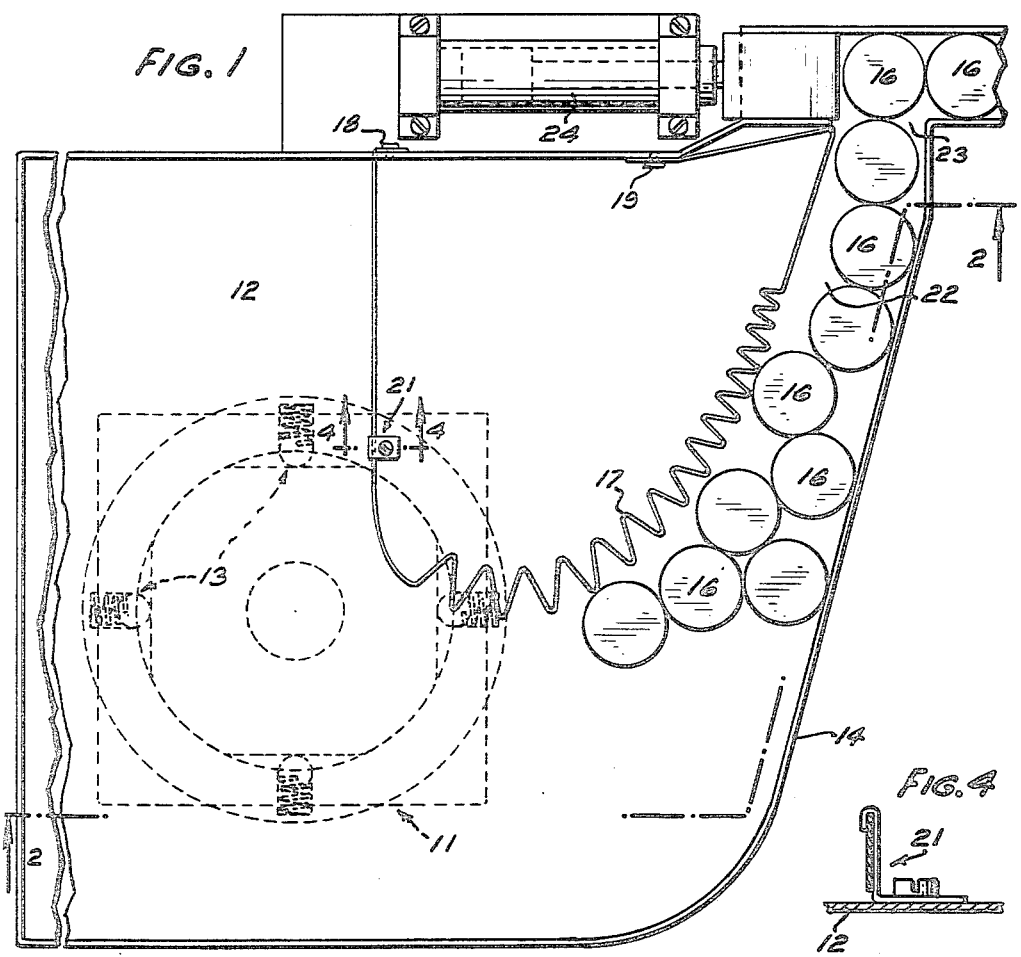
Fig. 1 is a top plan view of a vibratory feed mechanism embodying the principles of the present invention.
Figure 2:
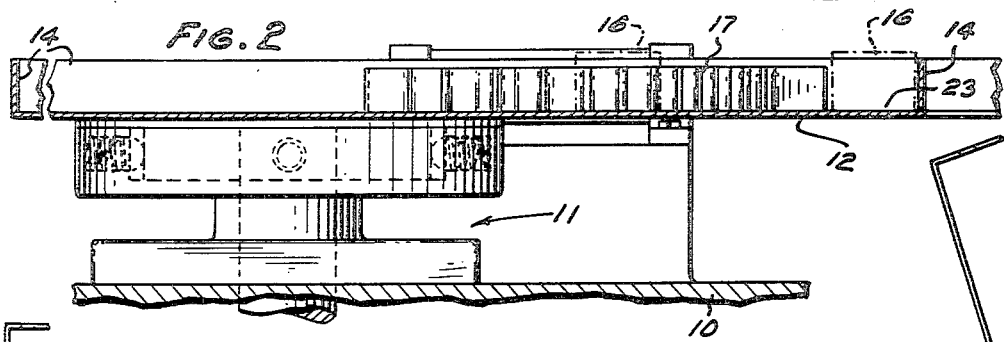
Fig. 2 is a sectional side view of the same mechanism taken along the line 2—2 of Fig. 1.
Figure 3:
Fig. 3 is an enlarged plan view of an undulated spring member.

Referring to Fig. 2, there is disclosed a base 10 upon which is mounted a standard vibratory device generally designated by the numeral 11. Secured to the vibratory device is a table 12. Vibration is imparted to the table 12 by means of a spring-pressed detent 13. The table 12 is provided with a flange 14 which precludes the random dispersement of a supply of articles 16 (Fig. 1).

Secured to the table 12 is a flat undulated spring member 17. This manner has a uniform height corresponding to that of the flange 14 (Fig. 2) and a sinusoidal or wavy configuration which is progressively decreasing in magnitude and period.

Referring now to Fig. 1, the spring member 17 is shown as being secured to the table 12 with rivet pins 18 and 19 and a hook 21 (Fig. 4). As illustrated, the decreasing undulations of the spring member and a portion of the flange 14 provide a converging channel 22 which is terminated at a constrained egress or outlet 23. An intermittently operated piston-cylinder unit 24 is provided to remove the articles 16 fed through the outlet 23.

Mode of operation

The mode of operation can best be explained by reference to Fig. 1 wherein there is disclosed a supply of circular articles 16 positioned on the table 12. A vibratory action is imparted to the table 12 from the device 11 by means of the detent 13. This vibratory motion advances the articles 16 positioned on the table in a counterclockwise direction about the source of vibration toward the mouth of the converging channel 22. A section of the spring 17, situated between the rivet pin 18 and the hook 21, has a motion imparted thereto which is primarily consistent with that imparted to the table 12. This motion is transferred to the articles engaging this section thereby hastening the advance of the articles to the channel 22.

The undulated section of the spring 17, which extends from the hook 21 to the rivet pin 19, is mounted on the table 12 for movement therewith and limited relative movement thereto. The undulations provide counterclockwise motion consistent with that of the table and impart numerous diverse normal and tangential forces to the articles being fed through the channel.

During the normal operation of the feed mechanism, jamming would most likely occur at the entrance of the converging channel since a plurality of articles from diverse locations on the table might well arrive at the entrance simultaneously. For this reason, the magnitude and the period of the undulations at the entrance to the channel are large and provide maximum actuation to the articles passing therethrough.

As the articles continue to advance through the gradually converging channel, the possibility of jamming and the necessity of imparting forces to several articles diminishes. Consequently, the magnitude and period of the undulations are progressively decreased and the forces provided thereby are concentrated on a single article. These forces serve to advance and maintain a continuous unrestricted passage of the articles through the egress or outlet 23. Having passed through the egress 23, the articles are removed by the action of the piston-cylinder unit 24.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a feed mechanism, a flanged vibratory table for advancing articles in a predetermined direction, an undulated spring member having successive peaks bent in alternate directions and periodically decreasing in width, and means for securing said spring member to said table to provide a curved article-engaging surface.

2. A feed mechanism comprising a vibratory table for advancing articles in a predetermined direction, a retaining flange positioned about the extremities of said table having a constrained egress formed therein, and a flat spring member formed in a sinusoidal configuration resiliently mounted on said table and cooperating with a portion of said flange to define a channel for guiding advancing articles to said egress.

3. In a feed mechanism, a vibratory table for advancing articles in a predetermined direction, a retaining flange positioned about the extremities of said table, a flat spring member formed in a sinusoidal configuration having sinusoids progressively decreasing in magnitude and period, and means for resiliently mounting said member on said table for movement therewith and relative movement thereto.

References Cited in the file of this patent

UNITED STATES PATENTS 2,827,158  Smith ------------------ Mar. 18, 1958

FOREIGN PATENTS 109,097  Australia --------------- Nov. 23, 1939